(No Model.)

2 Sheets—Sheet 1.

H. JAMES.
FRICTION CLUTCH.

No. 266,159.

Patented Oct. 17, 1882.

WITNESSES:
Chas. Nicola
C. Sedgwick

INVENTOR:
H. James
BY Munn & Co
ATTORNEYS.

(No Model.) 2 Sheets—Sheet 2.

H. JAMES.
FRICTION CLUTCH.

No. 266,159. Patented Oct. 17, 1882.

WITNESSES:

INVENTOR:
H. James
BY Munn & Co.
ATTORNEYS.

UNITED STATES PATENT OFFICE.

HENRY JAMES, OF HUDSON, NEW YORK.

FRICTION-CLUTCH.

SPECIFICATION forming part of Letters Patent No. 266,159, dated October 17, 1882.

Application filed August 7, 1882. (No model.)

*To all whom it may concern:*

Be it known that I, HENRY JAMES, of Hudson, Columbia county, New York, have invented a new and useful Improvement in Friction-Clutches, of which the following is a full, clear, and exact description.

Reference is to be had to the accompanying drawings, forming part of this specification, in which similar letters of reference indicate corresponding parts in all the figures.

Figure 1:
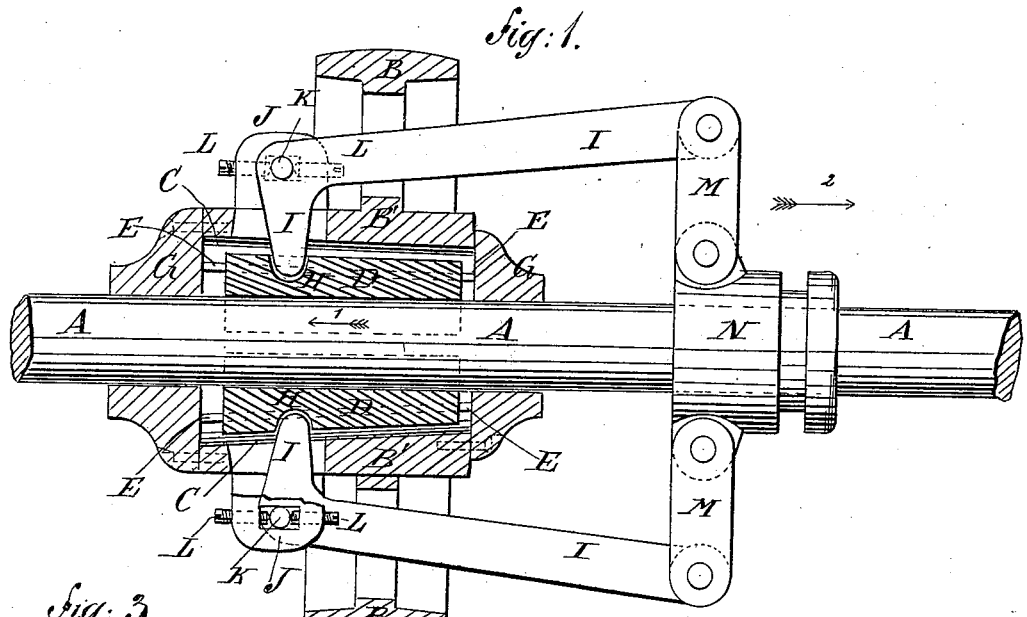
Figure 3:
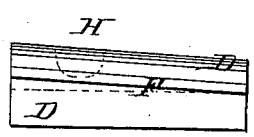
Figure 4:
Figure 4:
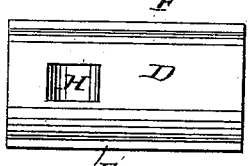
Figure 2:
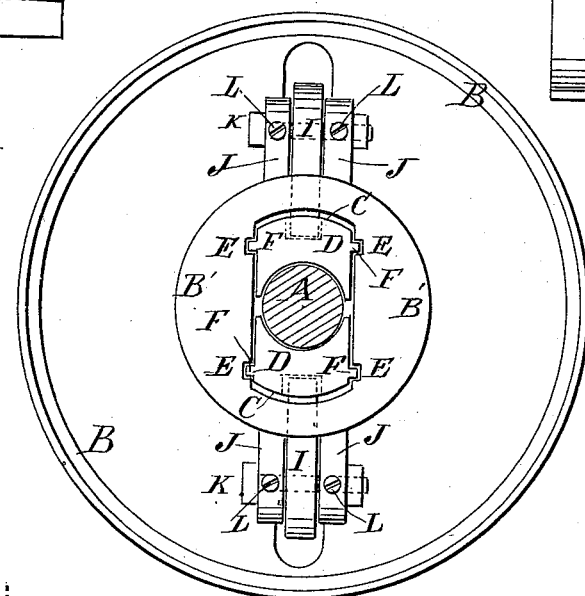
Figure 5:
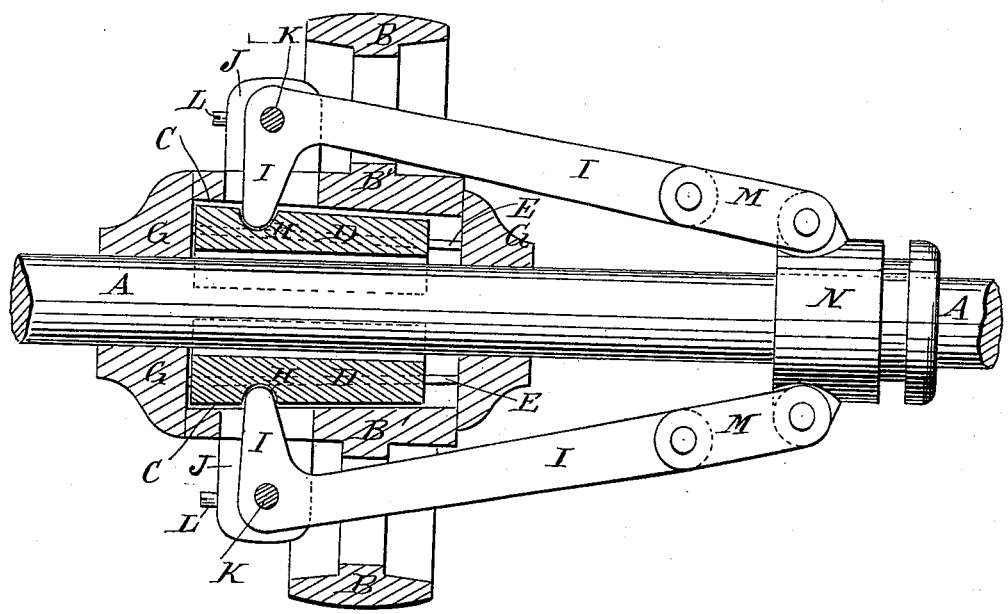

Figure 1, Sheet 1, is a sectional side elevation of my improvement, showing the wheel fastened to the shaft. Fig. 2, Sheet 1, is an end elevation of the same, the shaft being shown in section and the end collar of the hub being removed. Fig. 3, Sheet 1, is a side elevation of one of the friction-wedges. Fig. 4, Sheet 1, is a plan view of the same. Fig. 5, Sheet 2, is a sectional side elevation of my improvement, showing the wheel loose upon the shaft.

The object of this invention is to provide a simple, economical, and effective mechanism whereby driving-pulleys or other wheels of machinery may be readily locked upon and released from their shafts while the latter are in motion.

The invention consists in the combination, with the wheel or pulley and its wedge-shaped bearing-blocks and shaft, of a mechanism that is adapted to move the said bearing-blocks longitudinally while the shaft is in motion, and thereby to lock or unlock the pulley upon its shaft, as will be hereinafter set forth.

The invention also consists in certain novel details in the construction of various parts of the invention, as will be hereinafter described, and pointed out in the claims.

A represents a shaft, upon which is placed a loose pulley or wheel, B, of any suitable kind. In the hub B' of the pulley or wheel B is formed an oblong tapered or wedge-shaped recess, C, to receive the tapered or wedge-shaped blocks D, the inner sides of which are concaved to fit upon the shaft A. When the bearing-blocks D are moved longitudinally within the recess C in the direction of arrow 2 the said blocks will press with their concave faces upon the shaft A, while the backs of the blocks will present their surfaces against the interior surface of the hub B, and thus lock the pulley and shaft A together; but when the blocks D are moved in the contrary direction the pulley or wheel will be released from the shaft A and the pulley or wheel will run loose on said shaft.

In some cases I provide the blocks D and the interior of the recess C respectively with tongues and grooves, which construction I will now describe.

In the opposite sides of the recess C, and parallel with the inclined sides of the said recess, are formed grooves E at an angle with the line of the shaft A.

Upon the opposite sides of the wedge-blocks D, and parallel with the inclined sides of the said blocks, are formed tongues F to slide in the grooves E, so that as the said wedges D are moved in the direction of arrow 1 the tongues F and grooves E will move the said wedges out of contact with the shaft A, allowing the wheel B to revolve loosely. G are collar-shaft bearings attached to the ends of the wheel-hub B', which collar-bearings serve the further purpose of covering the ends of the hub.

It is essential to the successful operation of my invention that a mechanism shall be combined with the said bearing-blocks D, the wheel or pulley, and the shaft A that shall be adapted to move the said bearing-blocks longitudinally while the shaft A is in motion, and thereby to effect the locking or unlocking of the pulley or wheel upon the shaft without stopping the same. Any suitable mechanism capable of accomplishing this result may be employed. I will now proceed to describe a form of such mechanism that I have found very well adapted for the purpose just mentioned. This mechanism is composed of the elbow-levers I, links M, and collar N, made and operated as follows: In the backs of the wedges D are formed recesses H to receive the rounded ends of the short arms of the elbow-levers I, which pass in through slots in the sides of the hub of the wheel B. The levers I are pivoted at their angles to and between lugs J, formed upon the exterior of the hub B', by pivots K, which pass through holes in the said levers I, and through short slots in the lugs J, where they are held in place adjustably by set-screws L, which pass in through the opposite edges of the levers I in such directions that their forward ends will rest against the opposite sides of the pivots K, so that by adjusting the said screws L the throw of the levers I and wedges D may be adjusted to take up any wear of the said wedges. The long arms of the levers I pass through slots formed in or between the spokes of the wheel B, and their extremities are pivoted to the outer ends of links M, that are jointed at their inner ends to lugs formed upon the opposite sides of the sliding collar N, which runs upon the shaft A. The exterior of the collar N has an ordinary ring-groove to receive the forked end of the ordinary lever for moving the collar N longitudinally upon the shaft A. With this construction, when the collar N is moved in the direction of arrow 2 the outer ends of the long arms of the levers I will be moved toward the shaft A, which causes the short arms of the said levers to move the wedges D in the direction of arrow 1 and raises the said wedges out of contact with the shaft. As the collar N is moved in reverse direction of arrow 2, or toward the wheel B, the ends of the long arms of the said levers I will be moved from the shaft A, causing the short arms of the said levers to move the wedges D in the reverse direction from arrow 1, bringing them into contact with the shaft A, and locking the wheel. It will be understood that the degree of locking-pressure of the blocks D upon the shaft A is regulated by the set or extent of movement given to the collar N.

I do not limit myself to the exact form of any of the parts herein described, as they may be varied without departing from my invention.

Having thus described my invention, I claim as new and desire to secure by Letters Patent—

1. In a friction-clutch, the combination, with a loose pulley, of a wedge-shaped bearing-block working in a corresponding recess in the hub of said pulley, and adapted to be slid back and forth therein while the shaft is in motion, substantially as and for the purpose set forth.

2. In a friction-clutch, the combination, with a loose pulley provided with wedge-shaped recess in its hub, of a wedge-shaped bearing-block, and mechanism, substantially as shown and described, for sliding the said block back and forth in the said recess, as and for the purpose set forth.

3. In a friction-clutch, the combination, with the loose pulley B, provided with the wedge-shaped recess C in its hub, of the wedge-shaped bearing-block D, having a recess, H, the elbow-levers I, the links M, and the sliding collar N, substantially as and for the purpose set forth.

4. In a friction-clutch, the combination, with the loose pulley B, provided with the wedge-shaped recess C, having grooves E, of the wedge-shaped bearing-blocks D, provided with the tongues F and recess H, the elbow-levers I, the links M, and the sliding collar N, substantially as and for the purpose set forth.

5. In a friction-clutch, the combination, with the slotted hub B', of the loose pulley provided with the wedge-shaped recess C and the lugs J, and the wedge-shaped bearing-blocks D, of the elbow-levers I, adjustably pivoted therein, the links M, and the sliding collar N, substantially as and for the purpose set forth.

6. In a friction-clutch, the combination, with the slotted lugs J and the pivots K, of the set-screws L, substantially as herein shown and described, whereby the throw of the bent levers can be readily adjusted to take up the wear of the wedges, as set forth.

HENRY JAMES.

Witnesses:
C. SEDGWICK,
D. M. HOLDREDGE.